(12) United States Patent
Rojey et al.

(10) Patent No.: US 8,523,978 B2
(45) Date of Patent: Sep. 3, 2013

(54) METHOD OF DEACIDIZING A GAS BY MEANS OF AN ABSORBENT SOLUTION WITH FRACTIONATED REGENERATION THROUGH HEATING

(75) Inventors: Alexandre Rojey, Rueil Malmaison (FR); Renaud Cadours, Francheville (FR); Pierre-Louis Carrette, Lyons (FR); Pierre Boucot, Ternay (FR)

(73) Assignee: Institut Francais du Petrole, Rueil Malmaison (FR)

( * ) Notice: Subject to any disclaimer, the term of this patent is extended or adjusted under 35 U.S.C. 154(b) by 1123 days.

(21) Appl. No.: 12/282,403

(22) PCT Filed: Mar. 9, 2007

(86) PCT No.: PCT/FR2007/000430
§ 371 (c)(1),
(2), (4) Date: Feb. 6, 2009

(87) PCT Pub. No.: WO2007/104856
PCT Pub. Date: Sep. 20, 2007

(65) Prior Publication Data
US 2009/0199709 A1    Aug. 13, 2009

(30) Foreign Application Priority Data
Mar. 10, 2006    (FR) ...................... 06 02138

(51) Int. Cl.
*B01D 53/14*    (2006.01)
(52) U.S. Cl.
USPC .................. 95/181; 95/183; 95/193; 95/194; 95/196; 95/197; 95/209; 95/227; 95/235; 95/236; 423/220; 423/228

(58) Field of Classification Search
None
See application file for complete search history.

(56) References Cited

U.S. PATENT DOCUMENTS
2,475,334 A * 7/1949 Oldach .................... 423/228
3,495,933 A * 2/1970 Franckowiak et al. ....... 423/226
(Continued)

FOREIGN PATENT DOCUMENTS
EP    0 612 556 A    8/1994
FR    2 036 167 A    12/1970
FR    2036167    * 12/1970

OTHER PUBLICATIONS
International Search Report; International Application No. PCT/FR2007/000430 filed Mar. 9, 2007.

*Primary Examiner* — Duane Smith
*Assistant Examiner* — Pankti Patel
(74) *Attorney, Agent, or Firm* — Antonelli, Terry, Stout & Kraus, LLP.

(57) ABSTRACT

A method of deacidizing a gaseous effluent comprising acid compounds where the gaseous effluent is contacted in C1 with an adsorbent solution so as to obtain a gaseous effluent depleted in acid compounds and an absorbent solution laden with acid compounds, the absorbent solution being selected for its property of forming two separable phases when it has absorbed an amount of acid compounds and when it is heated. The absorbent solution laden with acid compounds is then heated in E1 and E3 so as to separate two fractions: a first absorbent solution fraction depleted in acid compounds and a second absorbent solution fraction enriched in acid compounds. These two fractions are then separated in BS1. The second fraction is regenerated in C2 so as to release part of the acid compounds, and the first absorbent solution fraction and the regenerated absorbent solution are recycled as absorbent solution.

19 Claims, 3 Drawing Sheets

(56) References Cited

U.S. PATENT DOCUMENTS

| | | | |
|---|---|---|---|
| 3,664,930 A * | 5/1972 | Pottiez et al. | 203/37 |
| 4,251,494 A | 2/1981 | Say | |
| 7,419,646 B2 * | 9/2008 | Cadours et al. | 423/220 |
| 8,206,489 B2 * | 6/2012 | Cadours et al. | 95/179 |
| 2004/0139855 A1 | 7/2004 | Collins et al. | |
| 2009/0199709 A1 * | 8/2009 | Rojey et al. | 95/46 |
| 2010/0104490 A1 * | 4/2010 | Bouillon et al. | 423/223 |

* cited by examiner

METHOD OF DEACIDIZING A GAS BY MEANS OF AN ABSORBENT SOLUTION WITH FRACTIONATED REGENERATION THROUGH HEATING

RELATED APPLICATION

This is a U.S. national phase application under 35 U.S.C. §371 of International Application No. PCT/FR2007/000430 filed Mar. 9, 2007 claiming priority of French Application No. 0602138 filed Mar. 10, 2006.

FIELD OF THE INVENTION

The present invention relates to the filed of deacidizing a gaseous effluent by means of an absorbent solution. The inventions provides a new absorbent solution regeneration mode.

The method according to the invention allows to remove the acid compounds, such as carbon dioxide ($CO_2$) and hydrogen sulfide ($H_2S$), contained in a gaseous effluent. It can be applied for treating a natural gas, a synthesis gas or fumes from a combustion process.

BACKGROUND OF THE INVENTION

Regeneration of the absorbent solution laden with acid compounds is costly, notably as regards energy consumption. This is a major drawback, notably when the absorbent solution is used to collect the $CO_2$ present in combustion fumes. In fact, although the heat required to regenerate the absorbent solution is obtained by combustion of a fossil fuel, an additional amount of $CO_2$ that would make the collection of $CO_2$ by absorption uninteresting may be produced.

The present invention aims to fractionate the absorbent solution laden with acid compounds into two parts, a fraction rich in acid compounds and a fraction poor in acid compounds, and to regenerate by distillation only the fraction that is enriched in acid. compounds in order to minimize the energy required for regeneration of the absorbent solution.

SUMMARY OF THE INVENTION

The invention provides a method of deacidizing a gaseous effluent comprising at least one acid compound of the group made up of hydrogen sulfide ($H_2S$), carbon dioxide ($CO_2$), wherein the following stages are carried out:
  a) contacting the gaseous effluent with an absorbent solution so as to obtain a gaseous effluent depleted in acid compounds and an absorbent solution laden with acid compounds, the absorbent solution being selected for its property of forming two separable liquid phases when it has absorbed an amount of acid compounds and when it is heated,
  b) heating the absorbent solution laden with acid compounds so that the absorbent solution divides into two liquid fractions: a first absorbent solution fraction depleted in acid compounds and a second absorbent solution fraction enriched in acid compounds,
  c) separating said two fractions obtained in stage b),
  d) regenerating the second fraction so as to release part of the acid compounds,
  e) recycling the first absorbent solution fraction and the regenerated absorbent solution as absorbent solution to stage a).

According to the invention, in stage b), the absorbent solution laden with acid compounds can be heated to a temperature ranging between 60° C. and 100° C.

In stage d), the second absorbent solution fraction can be distilled so as to produce a regenerated absorbent solution depleted in acid compounds by releasing acid compounds in gaseous form.

Stage a) can be carried out in a column, the first absorbent solution fraction and the regenerated absorbent solution being introduced at the top of the column.

Stage a) can be carried out in a column, the regenerated absorbent solution being introduced at the top of the column, the first absorbent solution fraction being introduced at an intermediate level between the bottom and the top of the column.

In stage c), one of the following separation techniques can be used: decantation, centrifugation, filtration.

Stages b) and c) can be carried out in a membrane contactor.

The absorbent solution can comprise a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

The absorbent solution can also comprise a salt promoting the property of forming two separable phases when said solution has absorbed an amount of acid compounds and when it is heated.

The absorbent solution can furthermore comprise an organic compound selected from the group consisting of: an amine, an alcohol, a ketone, a vinyl alcohol, a vinyl ketone, an ether alcohol, an ether ketone, a glycol, a polyethylene glycol, a polypropylene glycol, an ethylene glycol-propylene glycol copolymer, a glycol ether, a thioglycol, a thioalcohol, a sulfone, a sulfoxide, a N-alkylated pyrrolidone, a N-alkylated piperidone, a cyclotetramethylenesulfone, a N-alkylformamide, a N-alkylacetamide, an alkyl phosphate, an alkylene carbonate and a dialkyl carbonate.

The method according to the invention can be applied to one of the following gaseous effluents: natural gas, synthesis gas, combustion fumes, refinery gas, Claus tail gas, biomass fermentation gas.

In the method according to the invention, a fraction of the absorbent solution from the absorption stage is recycled to the absorption stage without changing from the liquid state to the vapour state. This allows to significantly reduce the costs associated with the stage of regeneration by distillation.

BRIEF DESCRIPTION OF THE FIGURES

Other features and advantages of the invention will be clear from reading the description hereafter, with reference to the accompanying figures wherein.

DETAILED DESCRIPTION

Figure 1:
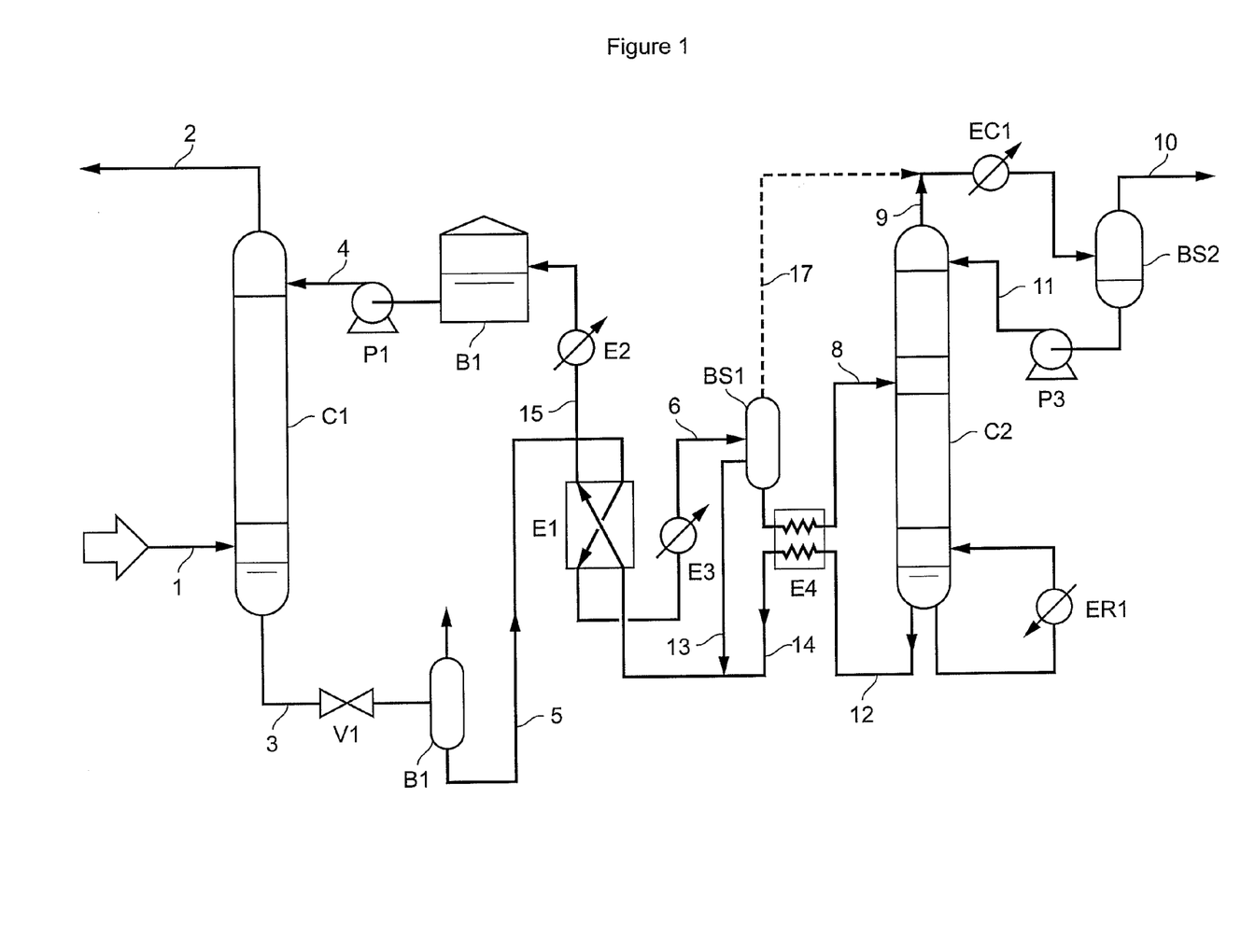
FIG. 1 shows an embodiment of the method according to the invention.

In FIG. 1, the gaseous effluent circulating in line 1 is contacted in absorption column C1 with the absorbent solution flowing in through line 4. The deacidizing method according to the invention can be applied to various gaseous effluents. For example, the method allows to decarbonate combustion fumes, to deacidize natural gas or a Claus tail gas. The method also allows to remove the acid compounds contained in synthesis gas, in conversion gas in integrated coal or natural gas combustion plants, and in the gas resulting from biomass fermentation.

In column C1, the reactive compounds of the absorbent solution react with the acid compounds to be collected so as to form a salt soluble in an aqueous phase. The gas depleted in acid compounds is discharged from C1 through line 2. The absorbent solution enriched in acid compounds in form of salts dissolved in water is discharged from C1 through line 3. This absorbent solution enriched in acid compounds however comprises a proportion of unreacted reactive compounds that may be significant.

The absorbent solution is an aqueous solution comprising one or more reactive compounds or having a physico-chemical affinity with acid compounds. An absorbent solution comprising compounds that react in a reversible manner with the acid compounds $H_2S$ and $CO_2$ is preferably selected. According to the invention, one selects a reactive compound having the property of forming, in the aqueous phase, two separable liquid phases when it has absorbed a predetermined amount of acid compounds and when the temperature is above a critical temperature. In other words, the reactive compound is selected in such a way that the absorbent solution laden with acid compounds forms two liquid phases when its temperature exceeds a critical demixing temperature.

The nature of the reactive compounds can be selected according to the nature of the acid compound(s) to be treated in order to allow a reversible chemical reaction with the acid compound(s) to be treated. The chemical structure of the reactive compounds can also be selected so as to furthermore obtain increased stability of the absorbent solution under the conditions of use.

The reactive compounds can be, by way of non limitative example, amines (primary, secondary, tertiary, cyclic or not, aromatic or not, saturated or not), alkanolamines, polyamines, amino-acids, amino-acid alkaline salts, amides, ureas, alkali metal phosphates, carbonates or borates.

The reactive compounds comprising an amine function preferably have the following structure:

wherein:
X represents an amine function (N—$R^6$) or an oxygen atom (O) or a sulfur atom (S) or a disulfide (S—S) or a carbonyl function (C=O) or a carboxyl function (O=C—O) or an amide function (O=C—N—$R^6$) or a phenyl or a nitrile function (CN) or a nitro group ($NO_2$),
n and m are integers. n can have any value from 0 to 8, preferably from 0 to 6, and m any value from 1 to 7, preferably from 1 to 5,
$R^5$ represents either a hydrogen atom or a hydrocarbon chain, branched or not, saturated or not, comprising 1 to 12 carbon atoms, preferably 1 to 10 carbon atoms. $R^5$ is absent when X represents a nitrile function (CN) or a nitro group ($NO_2$),
$R^1$, $R^2$, $R^3$, $R^4$ and $R^6$ represent either a hydrogen atom or a hydrocarbon chain, branched or not, saturated or not, comprising 1 to 12 carbon atoms, preferably 1 to 10 carbon atoms, or they have the following structure:

wherein:
n and p are integers. n can have any value from 0 to 8, preferably from 0 to 6, and p any value from 0 to 7, preferably from 0 to 5, X, $R^3$, $R^4$ and $R^5$ have the same definitions as above, they can be respectively identical or different from the X, $R^3$, $R^4$ and $R^5$ defining the amine function,
$R^1$, $R^2$, $R^3$, $R^4$, $R^5$ and $R^6$ are defined so as to be possibly bound by a chemical bond in order to form cycles or heterocycles, saturated or not, aromatic or not.

By way of non limitative example, the reactive compounds comprising an amine function can be selected from the following list: mono-ethanolamine, diethanolamine, triethanolamine, 2-(2-aminoethoxy)ethanol (diglycolamine), N,N-dimethylaminoethoxyethanol, N,N,N'-trimethyl-N'-hydroxy-ethyl-bisaminoethylether, N,N-bis-(3-dimethylaminopropyl)-N-isopropanol-amine, N-(3-dimethylaminopropyl)-N,N-diisopropanolamine, N,N-dimethylethanolamine, N-methylethanolamine, N-methyldiethanolamine, diisopropanolamine, morpholine, N-methylmorpholine, N-ethylmorpholine, N,N-dimethyl-1,3-propanediamine, N,N,N-tris(3-dimethylamino-propyl)amine, N,N,N',N'-tetramethyl-iminobispropylamine, N-(3-aminopropyl) morpholine, 3-methoxypropylamine, N-(2-aminoethyl)piperazine, bis-(2-dimethyl-aminoethyl)ether, 2,2-dimorpholinodiethylether, N,N'-dimethylpiperazine, N,N,N',N',N"-pentamethyldiethylenetriamine, N,N,N',N', N"-pentamethyldi-propylenetriamine, N,N-Bis(2,2-diethoxyethyl)methylamine, 3-butyl-2-(1-ethylpentyl) oxazolidine, 3-ethyl-2-methyl-2-(3-methylbutyl)oxazolidine, 1,2,2,6,6-pentamethyl-4-piperidone, 1-(2-methylpropyl)-4-piperidone, N,N,N',N'-tetraethylethylenediamine, N,N,N', N'-tetraethyliminobisethylamine, 1,1,4,7,10,10-hexamethyltriethylenetetramine, 1-phenylpiperazine, 1-formylpiperazine, ethyl 1-piperazinecarboxylate, N,N'-ditert-butylethylenediamine, 4-ethyl-2-methyl-2-(3-methylbutyl)oxazolidine, teraethylene-pentamine, triethylenetetramine, N,N-diethyldiethylenetriamine, $N^1$-isopropyl-diethylenetriamine, N,N-dimethyldipropylenetriamine, diethylenetriamine, N-(2-aminoethyl)-1,3-propanediamine, 2,2'-(ethylenedioxy)diethylamine, N-(2-aminoethyl) morpholine, 4-amino-2,2,6,6-tetramethylpiperidine, 1,2-diaminocyclohexane, 2-piperidinoethylamine, 2-(2-aminoethyl)-1-methylpyrrolidine, ethylenediamine, N,N-diethylethylenediamine, N-phenylethylenediamine, 4,9-dioxa-1,12-dodecanediamine, 4,7,10-trioxa-1,13-tridecanediamine, 1,2,4-trimethylpiperazine, N,N'-diethyl-N,N'-dimethylethylenediamine, N,N-diethyl-N',N'-dimethylethylenediamine, 1,4,7-trimethyl-1,4,7-triazacyclononane, 1,4-dimethyl-1,4-diazacycloheptane, N-(2-dimethyl-aminoethyl)-N'-methylpiperazine, N,N,N', N'-tetraethylpropylenediamine, 1-[2-(1-piperidinyl)ethyl)] piperidine, 4,4'-ethylenedimorpholine, N,N,N',N'-tetraethyl-N"-methyl-dipropylenetriamine, 4-(dimethylamino)-1,2,2,6,6-pentamethylpiperidine, 1,5,9-trimethyl-1,5,9-triazacyclododecane, 1,4,8,11-tetramethyl-1,4,8,11-tetraazacyclotetra-decane, N,N'-difurfurylethylenediamine, 1,2-Bis(2-aminoethyl)thioethane, Bis(2-aminoethyl)disulfide, Bis(2-dimethylaminoethyl)sulfide, 1-acetyl-2-diethylamino-ethane, 1-amino-2-benzylaminoethane, 1-acetyl-3-dimethylaminopropane, 1-dimethylamino-3,3-diphenylpropane, 2-(dimethylaminomethyl)thiophene, N,N,5-trimethylfurfurylamine, N,N-Bis(tetrahydro-2-furanylmethyl)amine, 2-(ethylsulfanyl)ethanamine, thiomorpholine, 2-[(2-aminoethyl)sulfanyl]ethanol, 3-thiomorpholinyl-methanol, 2-(butylamino)ethanethiol, Bis(2-diethylaminoethyl)ether, 1-dimethylamino-2-ethylmethylaminoethoxyethane, 1,2,3-triaminopropane, N~1~(2-aminopropyl)-1,2-propanediamine, N-methylbenzylamine, N-ethylbenzylamine, N-propylbenzylamine, N-isopropylbenzylamine, N-butylbenzylamine, N-tertiobutylbenzylamine, N-benzylpiperidone, 1,2,3,4-tetrahydroisoquinoline, 1-(2-methoxyphenyl)piperazine, 2-methyl-1-(3-methylphenyl)piperazine, 1-(2-pyridinyl)piperazine, benzhydrylamine, N-benzyl-N',N'-dimethylethylenediamine, 3-(methylamino) propionitrile, 3-(ethylamino) propionitrile, 3-(propylamino) propionitrile, 3-(butylamino)propionitrile, 3-(tertiobutylamino)propionitrile, 3-(pentylamino)propionitrile, 3-aminopropionitrile, 3-(1-piperidino)propionitrile, 1-hexanamine, 1-heptanamine, 1-octanamine, N-propyl-1-propanamine, N,N-dibutyl-1,2-ethanediamine, N,N,N',N'-tetramethyl-1,6-hexane-diamine, N,N'-dibutyl-1,3-propanediamine, N,N,N',N'-tetramethylethylenediamine, N,N,N',N'-tetramethylpropylenediamine, N,N-diethylpropylenediamine and N,N,N',N'-tetramethyl-1,3-butanediamine.

The reactive compounds can represent 10 to 100% by weight of the absorbent solution, preferably 25 to 90% by weight.

The absorbent solution can possibly also contain one or more activators for favouring absorption of the compounds to be treated. They can be, for example, amines, amino-acids, amino-acid alkali salts, alkali metal phosphates, carbonates or borates.

The activators comprising an amine function can preferably have the structure as follows:

wherein:
X represents an amine function ($N-R^6$) or an oxygen atom (O) or a sulfur atom (S) or a disulfide (S—S) or a carbonyl function (C=O) or a carboxyl function (O=C—O) or an amide function (O=C—N—$R^6$), a phenyl or a nitrile function (CN) or a nitro group ($NO_2$),
n and m are integers. n can have any value from 0 to 8, preferably from 0 to 6, and m any value from 1 to 7, preferably from 1 to 5,
$R^5$ represents either a hydrogen atom or a hydrocarbon chain, branched or not, saturated or not, comprising 1 to 12 carbon atoms, preferably 1 to 10 carbon atoms. $R^5$ is absent when X represents a cyano function (CN) or a nitro group ($NO_2$),
$R^1$, $R^2$, $R^3$, $R^4$ and $R^6$ represent either a hydrogen atom or a hydrocarbon chain, branched or not, saturated or not, comprising 1 to 12 carbon atoms, preferably 1 to 10 carbon atoms, or they have the following structure:

wherein:
n and p are integers. n can have any value from 0 to 8, preferably from 0 to 6, and p any value from 0 to 7, preferably from 0 to 5,
X, $R^3$, $R^4$ and $R^5$ have the same definitions as above, they can be respectively identical or different from the X, $R^3$, $R^4$ and $R^5$ defining the amine function,
$R^1$, $R^2$, $R^3$, $R^4$, $R^5$ and $R^6$ are defined in order to be possibly bound by a chemical bond in order to form cycles or heterocycles, saturated or not, aromatic or not,
$R^1$, $R^2$ and $R^6$ are selected in such a way that at least one of them represents a hydrogen atom.

The activator concentration ranges between 0 and 30% by weight, preferably between 0 and 15% by weight of the absorbent solution.

The activators can for example be selected from the following list: monoethanolamine, diethanolamine, 2-(2-aminoethoxy)ethanol (diglycolamine), N-methylethanolamine, N-ethylethanolamine, N-propylethanolamine, N-butylethanol-amine, N-(2-aminoethyl)ethanolamine, diisopropanolamine, 3-amino-1-propanol, morpholine, N,N-dimethyl-1,3-propanediamine, N,N,N',N'-tetramethyliminobis-propylamine, N-(3-aminopropyl)morpholine, 3-methoxypropylamine, 3-ethoxy-propylamine, N-(2-aminoethyl)piperazine, N-(3-aminopropyl)piperazine, N,N,N',N'-tetraethyliminobisethylamine, 1-phenylpiperazine, 1-formylpiperazine, ethyl 1-piperazinecarboxylate, N,N'-di-tert-butylethylenediamine, 4-ethyl-2-methyl-2-(3-methylbutyl)oxazolidine, tetraethylenepentamine, triethylenetetramine, N,N-diethyldiethylenetriamine, N~1~-isopropyldiethylenetriamine, N,N-dimethyl-dipropylenetriamine, dipropylenetriamine, diethylenetriamine, N-(2-aminoethyl)-1,3-propanediamine, 2,2'-(ethylenedioxy)diethylamine, N-(2-amino-ethyl)morpholine, 4-amino-2,2,6,6-tetramethylpiperidine, N-(2-aminoethyl)piperidine, N-(3-aminopropyl)piperidine, 1,2-diaminocyclohexane, N-cyclohexyl-1,3-propanediamine, 2-piperidino-ethylamine, 2-(2-aminoethyl)-1-methylpyrrolidine, ethylenediamine, N,N-diethyl-ethylenediamine, N-phenylethylenediamine, 4,9-dioxa-1,12-dodecanediamine, 4,7,10-trioxa-1,13-tridecanediamine, furfarylamine, N,N'-difurfarylethylenediamine, 1,2-Bis(2-aminoethyl)thioethane, Bis(2-aminoethyl)disulfide, Bis(aminoethyl)sulfide, 1-amino-2-benzylaminoethane, 2-(aminomethyl)thiophene, N,N-Bis(tetrahydro-2-furanylmethyl)amine, 2-(ethylsulfanyl)ethanamine, thiomorpholine, 2-[(2-aminoethyl)sulfanyl]ethanol, 2-(butylamino)ethanethiol, 1,2,3-triaminopropane, 1,3-diaminopropane, 1,4-diaminobutane, 1,5-diaminopentane, hexamethylenediamine, 1,2-propanediamine, 2-methyl-1,2-propanediamine, 2-methylpiperazine, N~2~,N~2~-dimethyl-1,2-propanediamine, N~1~,N~1~-dimethyl-1,2-propanediamine, 2,6-dimethylpiperazine, 1-ethyl-3-piperidinamine, N~1~-(2-aminopropyl)-1,2-propanediamine, decahydroquinoxaline, 2,3,5,6-tetramethylpiperazine, N,N-dimethyl(2-piperidinyl)methanamine, 1-(2-piperidinyl-methyl)piperidine, 2,2-dimethyl-1,3-propanediamine, N~1~,N~3~,2-trimethyl-1,3-propanediamine, 2-(aminomethyl)-2-methyl-1,3-propanediamine, N~1,N~1~,2,2-tetra-methyl-1,3-propanediamine, 1-methoxy-2-propanamine, tetrahydro-2-furanylmethylamine, 2,6-dimethylmorpholine, N-methyl(tetrahydro-2-furanyl)methanamine, N-methylbenzylamine, N-ethylbenzyl-amine, N-propylbenzylamine, N-isopropylbenzylamine, N-butylbenzylamine, 1,2,3,4-tetrahydroisoquinoline, 1-(2-methoxyphenyl)piperazine, 2-methyl-1-(3-methyl-phenyl)piperazine, 1-(2-pyridinyl)piperazine, benzhydrylamine, N-benzyl-N',N'-dimethylethylenediamine, 3-(methylamino) propionitrile, 3-(ethylamino)propionitrile, 3-(propylamino)propionitrile, 3-(butylamino)propionitrile, 3-(tertiobutylamino) propionitrile, 3-(pentylamino)propionitrile, 3-aminopropionitrile, 1-hexanamine, 1-heptanamine, 1-octanamine, N-propyl-1-propanamine, N,N-dibutyl-1,2-ethanediamine, N,N'-dibutyl-1,3-propanediamine and N,N-diethylpropylenediamine.

Addition of a solvent leading to the formation of two liquid phases through temperature rise can be combined with the use of a widely available and relatively inexpensive amine such as monoethanolamine (MEA), diethanolamine (DEA), methyldiethanolamine (MDEA) or diglycolamine (DGA) under conditions that would normally not cause the formation of two liquid phases.

The absorbent solution can also comprise an additional compound, for example a salt, favouring the demixing phenomenon. These salts can be, by way of non limitative example, alkaline, alkaline-earth, metal, amine, amino-acid salts or a mixture thereof. The associated anion can be, by way of non limitative example, a halogenide, a phosphate, a pyrophosphate, a sulfite, a sulfate, a hypochlorite, a nitrate, a nitrite, a phosphite, a carboxylate or a mixture. The amine(s) used to obtain these salts can be one or more of the amines present in the absorbent solution as reactive compounds with the acid compounds, or as activators, and which are partly neutralized by one or more acids stronger than the acids present in the gaseous effluent treated. The acids used can be, by way of non limitative example, phosphoric acid, pyrophosphoric acid, phosphorous acid, hypochlorous acid, nitrous acid, oxalic acid, acetic acid, formic acid, propanoic acid, butanoic acid, nitric acid, sulfuric acid, sulfurous acid, hydrochloric acid, amino-acids or a mixture. Other types of amines neutralized by such acids can also be added to the absorbent solution, for example in form of ammonium salts or other amine salts or a mixture of amine salts. Examples thereof are ammonium sulfate, ammonium phosphate or ammonium sulfite. These salts can also result from the partial degradation of the absorbent solution, for example as a result of the reaction of the reactive compounds with a contaminant in the gas treated. The salts can also be obtained after introduction of soda or potash to neutralize acids formed in the plant in which the method is applied. Besides, addition of salts can possibly be avoided in cases where the activators, the reactive compounds or any other additive come by nature in form of salts. The salt concentration can be adjusted according to the partial pressure and to the nature of the acid compound(s) present in the gaseous feed to be treated, and depending on the conditions of use.

The absorbent solution can also comprise one or more organic compounds intended to promote the demixing phenomenon. These compounds can be amines, alcohols, ketones, vinyl alcohols, vinyl ketones, ether alcohols, ether ketones, glycols, polyethylene glycols, polypropylene glycols, ethylene glycol-propylene glycol copolymers, glycol ethers, thioglycols, thioalcohols, sulfones, sulfoxides, N-alkylated pyrrolidones, N-alkylated piperidones, cyclotetramethylenesulfones, N-alkylformamides, N-alkylacetamides, alkyl phosphates, alkylene carbonates or dialkyl carbonates and derivatives thereof. By way of non limitative example, they can be 2-butanol, 2-butoxyethanol, 2-methyl-3-butene-2-ol, 3-butene-2-one, polyethyleneglycol of molar mass 400 g/mol, tetraethyleneglycoldimethylether, sulfolane, N-methylpyrrolidone, 1,3-dioxan-2-one, propylene carbonate, ethylene carbonate, diethyl carbonate, glycerol carbonate, dimethylpropyleneurea, N-methylcaprolactame, dimethylformamide, dimethylacetamide, formamide, acetamide, 2-methoxy-2-methyl-3-butanone, 2-methoxy-2-methyl-4-pentanone, 1,8-dihydroxy-3,6-dithiaoctane, 1,4-dithiane-2,5-diol, 2-(methylsulfonyl)ethanol, bis(2-hydroxyethyl)sulfone, 1,4-dithioerythritol or tributylphosphate.

The absorbent solution circulating in line 3 is expanded through expansion device V1 so as to vaporize part of the absorbed acid compounds and possibly co-absorbed hydrocarbons. The vapour fraction produced by the expansion in V1 is separated from the absorbent solution and discharged at the top of drum B1. Depending on its composition, this vapour fraction can be recycled upstream from the process, be used as fuel gas or mixed with the stream circulating in line 10. Then, the absorbent solution is sent through line 5 to heat exchanger E1, then E3. It flows out at a higher temperature through line 6. In heat exchangers E1 and E3, the absorbent solution laden with acid compounds is heated until it reaches a higher temperature than the critical temperature at which the solution laden with acid compounds forms two separable liquid phases. For example, the absorbent solution laden with acid compounds is heated to a temperature ranging between 60° C. and 100° C. Thus, the fluid circulating in line 6 consists of two separable liquid phases: a phase rich in acid compounds and a phase poor in acid compounds. Furthermore, under the effect of the temperature rise, part of the acid compounds is released in gaseous form. The three phases of the fluid circulating in line 6 are separated in separating drum BS1. The gaseous fraction from the top of BS1 is sent through line 17 to the top of distillation column C2. A first liquid fraction enriched in acid compounds, i.e. enriched in active compounds that have reacted with the acid compounds, is sent through line 8 to the distillation column. A second liquid fraction depleted in acid compounds, i.e. enriched in unreacted active compounds, is discharged from BS1 through line 13.

The first liquid fraction enriched in acid compounds circulating in line 8 can be heated by heat exchange in exchanger E4, then this liquid fraction is fed into distillation column C2 to be regenerated. Column C2 is equipped with a reboiler. In C2, the reactive compounds of the absorbent solution are separated from the acid compounds. The acid compounds are vaporized and discharged from C2 through line 9. The gas is cooled in condenser EC1 so as to be partly liquefied. Separating drum BS2 allows to collect the liquid fraction that is pumped by pump P3 to be fed through line 11 to the top of column C2 as reflux. The vapour fraction is discharged from BS2 through line 10. The regenerated absorbent solution is collected at the bottom of column C2 through line 12.

The heat released by cooling the absorbent solution recovered at the bottom of column C2 can be recovered in order to heat various streams to be regenerated. For example, in connection with FIG. 1, the absorbent solution circulating in line 12 allows to heat, in indirect heat exchanger E4, the first liquid fraction coming from BS1 through line 8. Then, this solution circulating in line 14 is mixed with the second liquid fraction coming from BS1 through line 13. This mixture is fed into exchanger E1 to heat the absorbent solution circulating in line 5. The mixture circulating in line 15 is then cooled by exchanger E2 to the operating temperature of column C1. The absorbent solution is stored in storage tank B1, from where it is taken up by pump P1 to be fed through line 4 into column C1.

In some cases, it may be desirable to recycle an absorbent solution very poor in acid compounds, i.e. with a high absorption capacity, to the top of column C1 in order to increase the acid compound removal efficiency and to reach advanced specifications for the treated gas. For example, the absorbent solution fraction depleted in acid compounds separated in separating drum BS1 may not be sufficiently efficient to collect acid compounds. Thus, in some cases, the absorbent solution fraction depleted in acid compounds from BS2 can be preferably sent to an intermediate point of absorption column C1, as diagrammatically shown in FIG. 2. In this case, only the absorbent solution fraction regenerated by distillation in C2 is sent to the top of the column.

Figure 2:
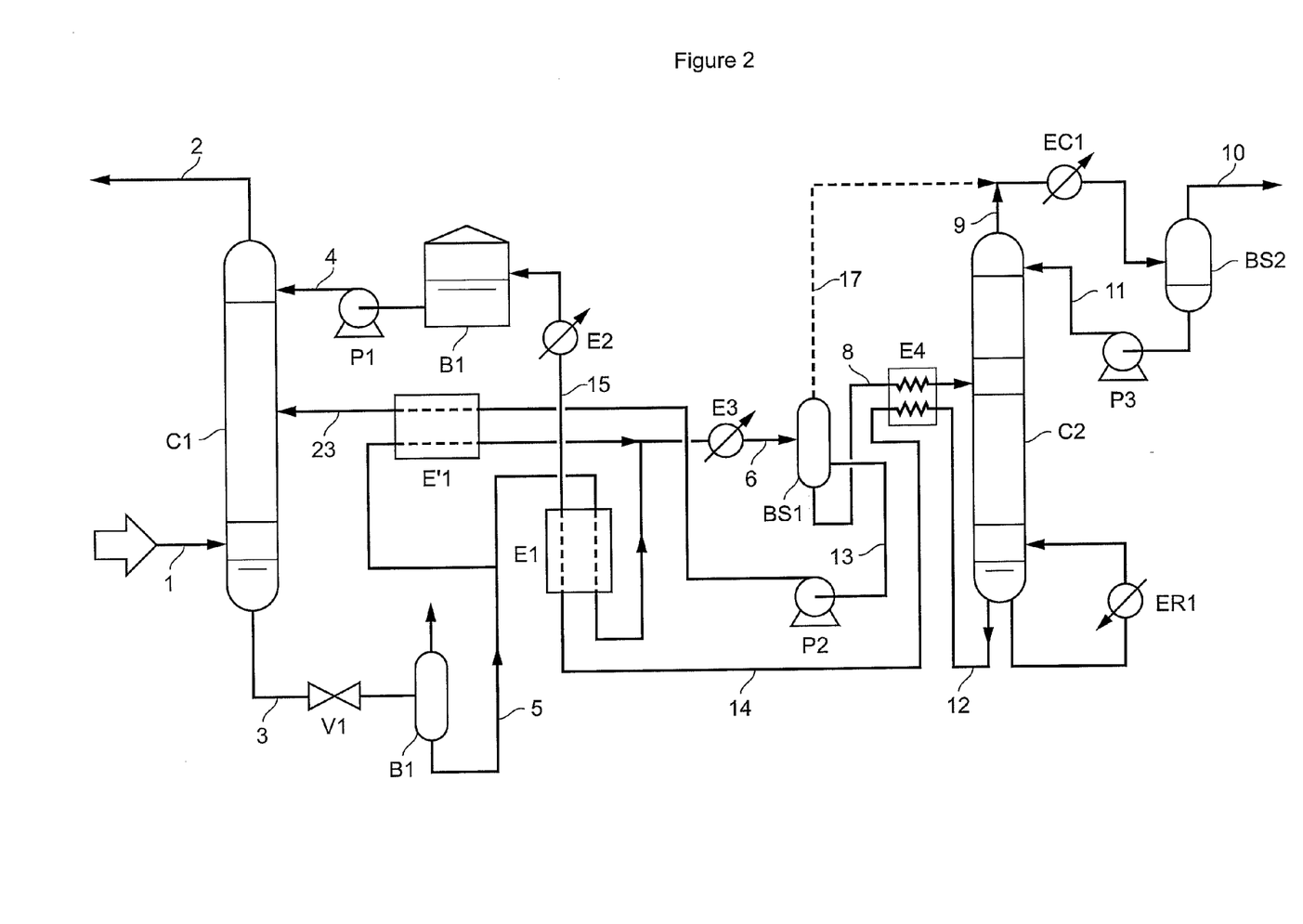
FIGS. 2 and 3 show two other embodiments of the invention.

The reference numbers of FIG. 2 identical to those of FIG. 1 refer to the same elements.

In FIG. 2, the absorbent solution laden with acid compounds circulating in line 5 is separated into two streams respectively heated in heat exchangers E1 and E'1, then combined and possibly heated by exchanger E3, then fed into separating drum BS1.

The second absorbent solution fraction depleted in acid compounds coming from BS1 through line 13 is taken up by pump P2, cooled by heat exchange in E'1, then fed through line 23 to an intermediate point of absorption column C1. Line 23 allows to inject the absorbent solution into C1 between the bottom and the top of the column, at a lower level in relation to the point of introduction through line 4.

The regenerated absorbent solution obtained at the bottom of column C2 is sent, after passage through elements E4, E1, E2, B1 and P1, to the top of column C1 through line 4.

Figure 3:
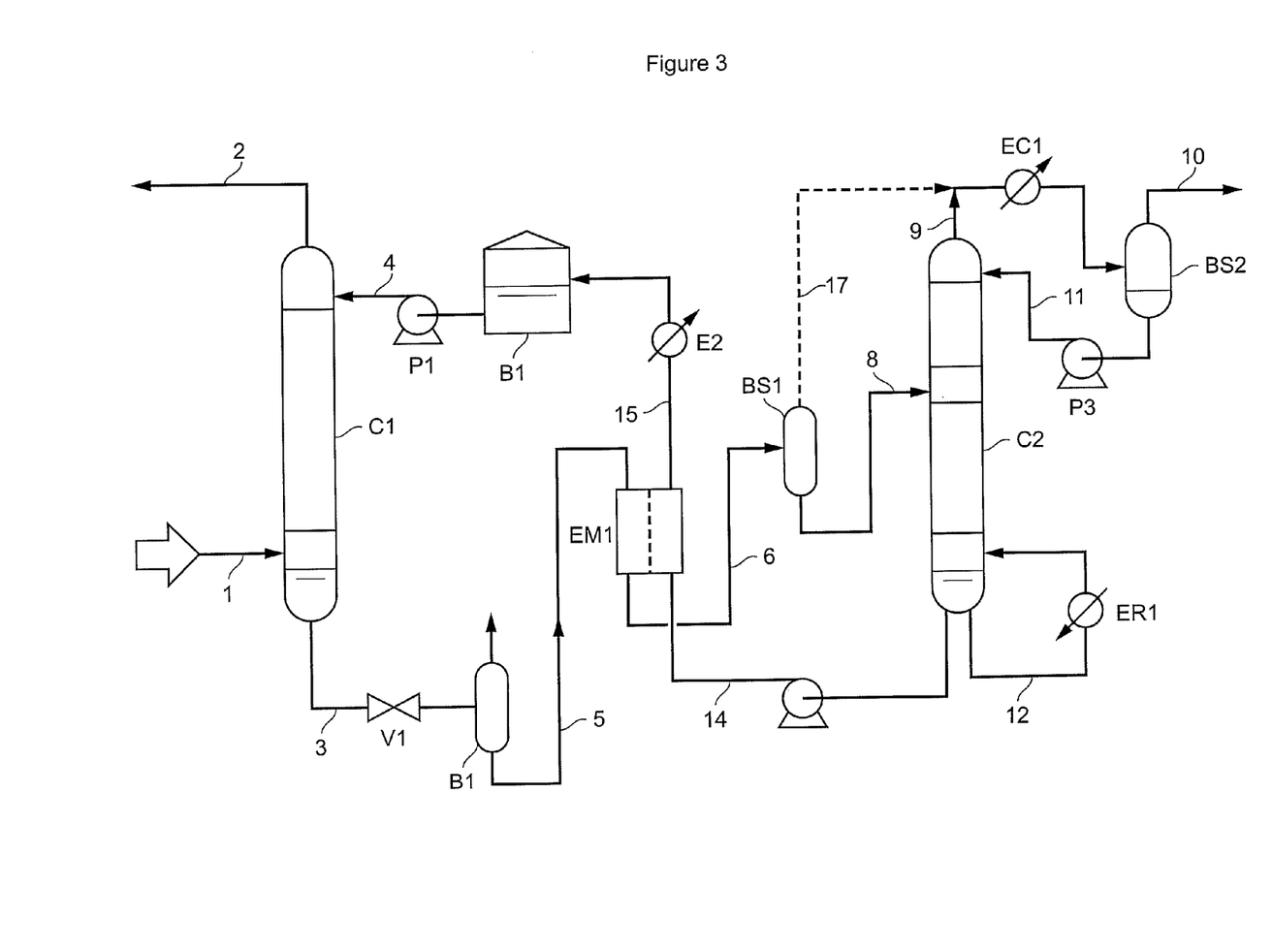

The method diagrammatically shown in FIG. 3 aims to use a membrane contactor for implementing the invention. The reference numbers of FIG. 3 identical to those of FIG. 1 refer to the same elements.

In FIG. 3, the absorbent solution laden with acid compounds circulating in line 5 is fed into membrane contactor EM1 to be contacted with the regenerated absorbent solution flowing in through line 14. In the membrane contactor, the streams are contacted by means of a membrane whose active layer has the property of being selectively permeable to the reactive compounds that have reacted with acid compounds. For example, the membrane is a polymer material such as silicone.

In membrane contactor EM1, the solution flowing in through line 5 is heated by indirect contact with the solution flowing in through line 14. When the solution coming from line 5 exceeds the critical demixing temperature, this solution divides into two liquid phases: a phase comprising the reactive compounds that have reacted with acid compounds and a phase comprising the reactive compounds that have not reacted with acid compounds. The selective permeability of the membrane of EM1 allows the unreacted reactive compounds to be transferred from stream 5 to stream 14.

The absorbent solution laden with acid compounds coming from the membrane contactor through line 6 is depleted in unreacted reactive compounds in relation to the solution circulating in line 5. It is fed into drum BS1 where the acid compounds released in gaseous form are discharged through line 17. The absorbent solution laden with acid compounds discharged from the bottom of BS1 is fed through line 8 into distillation column C2 to be regenerated.

The absorbent solution depleted in acid compounds coming from the membrane contactor through line 15 is enriched in unreacted reactive compounds in relation to the solution circulating in line 14.

Implementation of membrane contactor EM1 affords the advantage of carrying out, within a single device, heating and separation of the phases obtained by demixing.

The numerical examples hereafter allow to illustrate the present invention.

NUMERICAL EXAMPLE 1

We consider a water-N-propyl-1-propanamine solution at 20° C. whose composition is as follows, in molar fraction:
water: 0.6
N-propyl-1-propanamine: 0.4.
At a temperature of 80° C., two phases are formed, a nearly pure aqueous phase and an organic phase enriched in N-propyl-1-propanamine whose composition is as follows:
water: 0.24
N-propyl-1-propanamine: 0.76.

NUMERICAL EXAMPLE 2

A solvent made up of 75% by weight of N,N,N',N'-tetramethyl-1,3-butanediamine and of 25% by weight of water is contacted at 25° C. and at atmospheric pressure in a gas-liquid contactor with a $N_2$—$CO_2$ gaseous mixture containing 10% by volume of $CO_2$ until equilibrium is reached. After heating to 60° C., the solvent demixes so as to form two liquid phases. The absorbed $CO_2$ concentrates in the denser phase. This phase represents 10% of the total weight of the solvent.

Implementation of the method according to the invention is particularly interesting in the case of a low proportion of acid compounds in the absorbent solution. This is for example the case when a gas with a reduced $H_2S$ content, 100 ppm for example, is to be treated so as to lower this content down to 3 ppm for example. In this case, the fraction consisting of the water contained in the initial absorbent solution is essentially sent to the regeneration column. This allows to have to regenerate only a relatively small absorbent solution fraction.

Besides, in this case, the reboiler of the regeneration column can be operated at a relatively low temperature close to 100° C. This allows to use, for this reboiling, heat at a relatively low level, coming for example from thermal rejections. It is also possible to increase the pressure at which regeneration is carried out, to obtain acid gases under pressure, thus reducing the cost and the energy consumption of the acid gas compression plant when this gas is to be reinjected into the subsoil.

The present invention is also interesting within the context of treatment of a strongly acid gas, when the amine used can be at least partly regenerated by simple expansion. In this case, the amine forming no salt can be at least partly separated by demixing, which allows not to send it to the regeneration column.

The invention claimed is:

1. A method of deacidizing a gaseous effluent comprising at least one acid compound of the group made up of hydrogen sulfide ($H_2S$), carbon dioxide ($CO_2$), wherein the following stages are carried out:
   a) contacting the gaseous effluent with an absorbent solution so as to obtain a gaseous effluent depleted in acid compounds and an absorbent solution laden with acid compounds, the absorbent solution being selected for its property of forming two separable liquid phases when it has absorbed an amount of acid compounds and when it is heated,
   b) heating the absorbent solution laden with acid compounds so that the absorbent solution divides into two liquid fractions: a first absorbent solution fraction depleted in acid compounds and a second absorbent solution fraction enriched in acid compounds,
   c) separating said two fractions obtained in stage b),
   d) regenerating the second fraction so as to release part of the acid compounds,
   e) recycling the first absorbent solution fraction and the regenerated absorbent solution as absorbent solution to stage a).

2. A method as claimed in claim 1 wherein, in stage b), the absorbent solution laden with acid compounds is heated to a temperature ranging between 60° C. and 100° C.

3. A method as claimed in claim 1 wherein, in stage d), the second absorbent solution fraction is distilled so as to produce a regenerated absorbent solution depleted in acid compounds by releasing acid compounds in gaseous form.

4. A method as claimed in claim 1, wherein stage a) is carried out in a column, the first absorbent solution fraction and the regenerated absorbent solution being introduced at the top of the column.

5. A method as claimed in claim 1, wherein stage a) is carried out in a column, the regenerated absorbent solution being introduced at the top of the column, the first absorbent solution fraction being introduced at an intermediate level between the bottom and the top of the column.

6. A method as claimed in claim 1 wherein, in stage c), one of the following separation techniques is used: decantation, centrifugation, filtration.

7. A method as claimed in claim 1, wherein stages b) and c) are carried out in a membrane contactor.

8. A method as claimed in claim 1, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

9. A method as claimed in claim 8, wherein the absorbent solution further comprises a salt promoting the property of forming two separable phases when said solution has absorbed an amount of acid compounds and when it is heated.

10. A method as claimed in claim 8, wherein the absorbent solution further comprises an organic compound selected from the group consisting of: an amine, an alcohol, a ketone, a vinyl alcohol, a vinyl ketone, an ether alcohol, an ether ketone, a glycol, a polyethylene glycol, a polypropylene glycol, an ethylene glycolpropylene glycol copolymer, a glycol ether, a thioglycol, a thioalcohol, a sulfone, a sulfoxide, a N-alkylated pyrrolidone, a N-alkylated piperidone, a cyclotetramethylenesulfone, a N-alkylformamide, a N-alkylacetamide, an alkyl phosphate, an alkylene carbonate and a dialkyl carbonate.

11. A method as claimed in claim 1, wherein the gaseous effluent is selected from consisting of natural gas, synthesis gas, combustion fumes, refinery gas, Claus tail gas, biomass fermentation gas.

12. A method as claimed in claim 7 wherein, in stage b), the absorbent solution laden with acid compounds is heated to a temperature ranging between 60° C. and 100° C.

13. A method as claimed in claim 7 wherein, in stage d), the second absorbent solution fraction is distilled so as to produce a regenerated absorbent solution depleted in acid compounds by releasing acid compounds in gaseous form.

14. A method as claimed in claim 7, wherein stage a) is carried out in a column, the first absorbent solution fraction and the regenerated absorbent solution being introduced at the top of the column.

15. A method as claimed in claim 7, wherein stage a) is carried out in a column, the regenerated absorbent solution being introduced at the top of the column, the first absorbent solution fraction being introduced at an intermediate level between the bottom and the top of the column.

16. A method as claimed in claim 7, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

17. A method as claimed in claim 16, wherein the absorbent solution further comprises a salt promoting the property of forming two separable phases when said solution has absorbed an amount of acid compounds and when it is heated.

18. A method as claimed in claim 16, wherein the absorbent solution further comprises an organic compound selected from the group consisting of: an amine, an alcohol, a ketone, a vinyl alcohol, a vinyl ketone, an ether alcohol, an ether ketone, a glycol, a polyethylene glycol, a polypropylene glycol, an ethylene glycolpropylene glycol copolymer, a glycol ether, a thioglycol, a thioalcohol, a sulfone, a sulfoxide, a N-alkylated pyrrolidone, a N-alkylated piperidone, a cyclotetramethylenesulfone, a N-alkylformamide, a N-alkylacetamide, an alkyl phosphate, an alkylene carbonate and a dialkyl carbonate.

19. A method as claimed in claim 7, wherein the gaseous effluent is selected from consisting of natural gas, synthesis gas, combustion fumes, refinery gas, Claus tail gas, biomass fermentation gas.

* * * * *